(12) United States Patent
Krause et al.

(10) Patent No.: US 11,584,468 B2
(45) Date of Patent: Feb. 21, 2023

(54) BICYCLE SADDLE

(71) Applicant: Ergon International GmbH, Koblenz (DE)

(72) Inventors: Andreas Krause, Koblenz (DE); Franc Arnold, Koblenz (DE)

(73) Assignee: Ergon International GmbH, Koblenz (DE)

( * ) Notice: Subject to any disclaimer, the term of this patent is extended or adjusted under 35 U.S.C. 154(b) by 0 days.

(21) Appl. No.: 16/999,256

(22) Filed: Aug. 21, 2020

(65) Prior Publication Data

US 2021/0053637 A1    Feb. 25, 2021

(30) Foreign Application Priority Data

Aug. 22, 2019 (DE) .................... 20 2019 104 601.5

(51) Int. Cl.
  *B62J 1/08* (2006.01)
  *A47C 7/20* (2006.01)
(52) U.S. Cl.
  CPC .. *B62J 1/08* (2013.01); *A47C 7/20* (2013.01)
(58) Field of Classification Search
  CPC ........ B62J 1/02; B62J 1/26; B62J 1/08; A47C 7/20
  See application file for complete search history.

(56) References Cited

U.S. PATENT DOCUMENTS

| | | | | |
|---|---|---|---|---|
| 4,999,068 A | * | 3/1991 | Chiarella | B62J 1/18 156/145 |
| 6,136,426 A | * | 10/2000 | Bigolin | B62J 1/26 264/271.1 |
| 7,717,505 B2 | | 5/2010 | Yu | |
| 9,138,062 B2 | * | 9/2015 | Todd | A47C 7/74 |
| 9,242,689 B2 | * | 1/2016 | Yeh | B62J 1/26 |
| 9,358,912 B2 | * | 6/2016 | Nappi | B60N 2/24 |
| 10,442,484 B1 | * | 10/2019 | Sung | B32B 5/18 |
| 10,633,048 B2 | * | 4/2020 | Pruitt | B62J 1/007 |
| 2004/0051352 A1 | * | 3/2004 | Bigolin | B62J 1/20 297/214 |
| 2005/0121951 A1 | * | 6/2005 | Yu | B62J 1/00 297/195.1 |
| 2009/0189421 A1 | * | 7/2009 | Yu | B62J 1/22 297/195.1 |
| 2013/0097777 A1 | * | 4/2013 | Marquette | A47C 7/74 5/423 |
| 2015/0130234 A1 | | 5/2015 | Bailie et al. | |
| 2015/0191209 A1 | | 7/2015 | Yeh | |
| 2018/0244332 A1 | * | 8/2018 | Krause | B62J 1/26 |

(Continued)

FOREIGN PATENT DOCUMENTS

| | | |
|---|---|---|
| CN | 104773232 A | 7/2015 |
| DE | 202005013749 U1 | 11/2005 |

(Continued)

*Primary Examiner* — Philip F Gabler
(74) *Attorney, Agent, or Firm* — The Webb Law Firm

(57) ABSTRACT

A bicycle saddle includes a saddle shell with a saddle frame arranged on the lower side thereof. A first saddle cushion is arranged on the upper side of the saddle shell. An intermediate shell is arranged on an upper side of the saddle cushion. On the upper side of the latter, a second cushion element is arranged. The intermediate shell includes at least one recess for improving comfort in particular in the case of a perched sitting position.

10 Claims, 2 Drawing Sheets

(56) References Cited

U.S. PATENT DOCUMENTS

| | | | |
|---|---|---|---|
| 2020/0010135 A1* | 1/2020 | Arnold | B62J 1/007 |
| 2020/0255080 A1 | 8/2020 | Krause et al. | |
| 2021/0362794 A1 | 11/2021 | Arnold et al. | |

FOREIGN PATENT DOCUMENTS

| | | |
|---|---|---|
| DE | 202005007672 U1 | 12/2005 |
| DE | 202008018006 U1 | 5/2011 |
| EP | 0692510 A1 | 1/1996 |
| EP | 1174458 A1 | 1/2002 |
| EP | 1174459 A1 | 1/2002 |
| EP | 2708455 A1 | 3/2014 |
| EP | 3441291 A1 | 2/2019 |
| EP | 3564101 A1 | 11/2019 |
| WO | 0044821 A1 | 8/2000 |
| WO | 2018137971 A1 | 8/2018 |
| WO | 2018219635 A1 | 12/2018 |
| WO | 2018225098 A1 | 12/2018 |

* cited by examiner

BICYCLE SADDLE

CROSS-REFERENCE TO RELATED APPLICATION

This application claims priority to German Patent Application No. 20 2019 104 601.5 filed Aug. 22, 2019, the disclosure of which is hereby incorporated by reference in its entirety.

BACKGROUND OF THE INVENTION

Field of the Invention

The disclosure relates to a bicycle saddle.

Description of Related Art

Bicycle saddles are connected to a seat post via a saddle frame arranged on a bottom side of a saddle shell. A seat cushion is arranged on the upper side of the saddle shell for damping purposes. Typically, the seat cushion is covered or spanned with a cover layer or a coating. A variety of different bicycle saddle designs exists, each with the objective to improve the comfort of bicycle saddles. For example, gel pads are arranged inside the seat cushion to improve comfort. It is also known to provide damping elements e.g. between the saddle frame and the saddle shell, in particular in the region of the rear of the saddle. Various types of bicycle saddles often have the disadvantage that the comfort is relatively low and/or the weight of the saddles is high.

A bicycle saddle with which a very good improvement in comfort can be achieved is known from PCT/EP2018/062498. In addition to a conventional saddle shell to the bottom side of which the saddle frame is fastened, this bicycle saddle has a second saddle shell. The same is arranged spaced from the lower saddle shell, wherein a cushion element being interposed between the two saddle shells. A second cushion element is provided on the upper side of the upper saddle shell. Using such a bicycle saddle having two saddle shells the tilting movement of the hip which occurs during pedaling can be absorbed well, since the upper saddle shell can be tilted relative to the lower saddle shell. The pressure load on the sitbones can thereby be reduced significantly. With such a bicycle saddle, the sitting comfort can be improved significantly, in particular in the case of a relatively upright sitting position. Although, using this bicycle saddle, an improvement in sitting comfort can be achieved also in a bent sitting position, the improvement in comfort is less effective in a bent sitting position than in an upright sitting position.

It is an object of the disclosure to provide a bicycle saddle having good comfort characteristics even in the case of a bent sitting position.

The object is achieved according to this disclosure with a bicycle saddle.

SUMMARY OF THE INVENTION

The bicycle saddle of the disclosure comprises a saddle shell at the bottom side of which a saddle frame is arranged. The saddle frame serves to connect the bicycle saddle to a seat post. A first cushion element is arranged on an upper surface of the saddle shell. The first cushion element preferably covers all of the upper side of the saddle shell, wherein the cushion element may be manufactured from a plurality of individual cushion parts, possibly of different materials. An intermediate shell is arranged on an upper surface of the first cushion element. The intermediate shell, as well as the saddle shell itself, is made of a harder plastic material, wherein the intermediate shell and the saddle shell do not have to be made of the same material. A second cushion element is arranged on an upper side of the intermediate shell. This element preferably forms the upper side of the saddle and thus has dimensions corresponding to the first cushion elements and the saddle shell, respectively.

According the disclosure the intermediate shell is not continuous but has at least one recess. By providing such a recess, the damping characteristics of the saddle can be changed. Specifically, by a suitable arrangement of the at least one recess, the intermediate shell can be designed to be softer in a central region of the saddle. In a bent sitting position, the principal load occurs in the central region of the saddle. In a bent sitting position, the greatest forces are transmitted in the central region of the saddle in particular to the perineal region of the user.

By providing an intermediate shell with recesses, it is possible to further improve a bicycle saddle having two saddle shells, as known from PCT/EP2018/062498, with respect to its comfort. First, the tilting movement of the hip occurring during pedaling can still be absorbed well by the intermediate shell, e.g. the upper of the two saddle shells which is entirely separated from the lower saddle shell by the lower cushion. Further, the upper saddle shell or the intermediate shell is still tilted relative to the low saddle shell as in the known saddle with two saddle shells. Comfort is significantly increased thereby. The additional provision of the at least one recess in the intermediate shell allows for a further improvement in comfort, since the saddle shell can be designed to be more flexible. Depending on the type of saddle, it is also possible to provide one or even a plurality of recesses formed differently. In particular in the case of a bent sitting position a good tilting movement of the intermediate shell is realized because of the recess.

Preferably, the first and the second cushion element are connected to each other at least in the region of the at least one recess, or the two cushion elements at least abut each other in this region. It is also possible, e.g. in the case of foamed cushion elements, to manufacture these together, so that at least parts of the first and the second cushion element are formed as an integral cushion element and the two cushion elements are connected to each other in particular via the at least one recess.

Preferably, the intermediate shell is formed in a frame-shaped design. In particular, the intermediate shell is formed to extend circumferentially and, as is particularly preferred, the intermediate shell is arranged in an edge region of the cushion elements. Specifically, the intermediate shell can be arranged such that an outer edge of the intermediate shell is visible from outside or extends into the edge region of the saddle.

In another preferred embodiment the intermediate shell is not formed as a closed frame. However, the intermediate shell is formed at least such that it is arranged in the lateral region as well as in the rear and the sitting region of the saddle. The intermediate shell is thus U-shaped in plan view and is open in particular only in the region of the saddle tip.

Regardless of the exact design of the intermediate shell, the intermediate shell can also be designed such that the intermediate shell is arranged in particular completely within the two saddle cushions and thus an outer edge of the intermediate shell is not visible. Rather, the outer edge of the intermediate shell is arranged a few millimeters inside the saddle, e.g. at a small distance from the outer side of the saddle within and in particular between the two cushion elements. In this manner a soft edge is realized in particular in the lateral region of the saddle. In a rear or rearward region of the saddle, the saddle may again be visible. Shifting the saddle shell inward is advantageous in that an ingress of humidity is prevented in this region between the saddle shell and the cushion element.

The at least one recess is preferably designed such that a recess is provided in a sitting region and/or the central region and/or in the region of the saddle tip. These may be individual recesses, while it is preferred that in particular in the sitting region and in the central region a common recess is provided which in a particularly preferred embodiment extends into the region of the saddle tip. Thus, it is particularly preferred that a recess is provided that extends from the sitting region into the region of the saddle tip via the central region.

In a preferred embodiment the recess is covered or spanned by the first and/or second cushion element. In this respect it is preferred that the recess is not visible, but is arranged within the two cushion elements, in particular within a boundary surface between the two cushion elements. If so desired, the two cushion elements may also be formed integrally so that the cushion element extends completely through the recess so that the recess is filled completely by the cushion element.

Possibly, additional recesses can be provided in the edge surrounding this central recess.

In a particularly preferred embodiment, the intermediate shell is designed such that the at least one recess is arranged such that the sitbones of the user are always positioned above the intermediate shell. Specifically, the recess is arranged such that it is avoided that the sitbones are positioned in an edge region of the intermediate shell. By such a design of the intermediate shell it is ensured that the sitting comfort is very good due to the possible tilting between the two shells.

In the sitting region of the saddle the recess preferably has a width of 40 to 80%, in particular 50 to 75% of the width of the intermediate shell or of the width of the saddle in this region. In the sitting region the opening preferably has a width of 2 to 6 cm and the region of the intermediate shell provided on either side of the recess has a width of 1.5 to 3 cm. However, depending on the saddle type and application of the saddle, the intermediate shell is preferably always designed such that the sitbones of the user are arranged above the intermediate shell.

In the central region and/or in the region of the saddle tip the recess has a width of preferably 40 to 80%, in particular 50 to 75% of the width of the intermediate shell or of the saddle in this region. In the central region and in the region of the saddle tip the recess has a width of 1 to 2 cm and the respective edge has a width of 0.5 to 1.5 cm.

The intermediate shell and in particular the entire bicycle saddle is formed symmetrically with respect to a longitudinal center line.

The intermediate shell and/or in particular the saddle shell are preferably made of plastic material and/or comprise plastic material. Here, it is particularly preferred to use fiber-reinforced plastic material. It is particularly preferred to manufacture the intermediate shell and/or the saddle shell from carbon. Preferably, the saddle shell has a module of elasticity of at least 3000 MPa, in particular at least 4000 MPa and particularly preferred at least 6000 MPa. It is particularly preferred that the module of elasticity of the intermediate shell is lower than the module of elasticity of the saddle shell. The module of elasticity of the intermediate shell is preferably in the range of 1000 to 2000 MPA. Preferably, the module of elasticity of the intermediate Layer is in the range of 30 to 60%, in particular 40 to 50% of the saddle shell.

The saddle shell and/or the intermediate shell preferably comprise a thickness of at least 1 to 3 mm, wherein the intermediate shell may possibly have a lesser width than the saddle shell.

The saddle shell may be made of an in particular fiber-reinforced plastic material. The saddle shell may also be made of PA6, PP or similar materials. The intermediate layer may be made in particular of fiber-reinforced plastic material. It is preferred to manufacture the intermediate shell from TPU.

The individual cushion element of the saddle cushion may, in a preferred embodiment, be made from various materials, wherein it is also possible that the saddle cushion is made from only a single cushion element. It is preferred that at least one of the cushion elements, in particular the first cushion element, comprises one or more particulate foams or, in particular, is made from one or more particulate foams. It is particularly preferred to manufacture the saddle cushion, individual cushion elements and in particular the first cushion element from E-TPU (expanded thermoplastic polyurethane), wherein the corresponding saddle cushion or cushion element at least comprises E-TPU.

The material produced by BASF under the product name "Infinergy" is particularly suited for this purpose. Methods for producing TPU are described e.g. in EP 692 510, WO 00/44821, EP 11 74 459 and EP 11 74 458. Further, the seat cushion or individual cushion elements may be made from EVA (ethylene vinyl acetate) or include EVA. Further, EPP (expanded polypropylene) and EPE (expanded polyethylene) may be used as materials. A combination of these materials or a combination of these materials with other materials is also possible, e.g. in a multi-layered structure. In particular, mixtures with co- or terpolymers may also be used. Thereby, different damping and movement characteristics of the at least one cushion element can be obtained. It is also possible to provide a higher compaction of the corresponding materials in different regions, so that the damping and movement characteristics can be influenced thereby.

Moreover, a thermoplastic elastomeric spherical foam is suited as a material for the at least one cushion element. Such a foam is offered by Sekisui under the product name "ELASTIL". In particular, this is a closed-cell foam. In a preferred embodiment, the at least one cushion element comprises a thermoplastic elastomeric spherical foam, such as in particular Elastil, or is made from the same. A combination with the other materials described, which are suitable for forming the at least cushion element, is also possible.

Another well suited material for forming the at least one cushion element is a polyester-based PU material. In this respect, the material offered by BASF under the product name "Elastopan" is particularly suited. Preferably, the at least one cushion element includes such a material or is made therefrom, while it is again possible to combine this material with other materials described.

It is particularly preferred that the at least one cushion element includes one or a plurality of particulate foams and is, in particular, made from one or a plurality of particulate foams. As a base material, E-PTU, EPP, EPS, EPE or similar foams are particularly preferred. Generally, particulate foams are formed by small spheres of the expanded base material. These particles formed as spheres or other bodies are given their final shape in a tool, such as a mold or the like, using temperature and, possibly, water vapor. It is also possible to perform a melting or coalescing of the spheres or particles by supplying energy, in particular in the form of radio waves. Such an RF method has the particular advantage that drying the component can be omitted and the component can be processed immediately. In particular, particulate foams have the advantage that they have a low density, a good heat/cold insulation and good damping characteristics.

Further, it is particularly preferred that the at least one cushion element has a low weight due to its low density. Specifically, the at least one cushion element has a density of less than 1 $g/cm^3$, particularly preferred less than 0.5 $g/cm^3$ and in particular less than 0.2 $g/cm^3$. One of the particularly preferred materials, the material Elastil, has a thickness in the range of 0.05 to 0.2 $g/cm^3$.

The rebound behavior of the at least one cushion element is preferably in the range of preferably more than 30%, in particular more than 40%, and in particularly preferred more than 50%.

The disclosure will be described hereunder in more detail with reference to a preferred embodiment and to the accompanying drawings.

DESCRIPTION OF THE INVENTION

Figure 1:
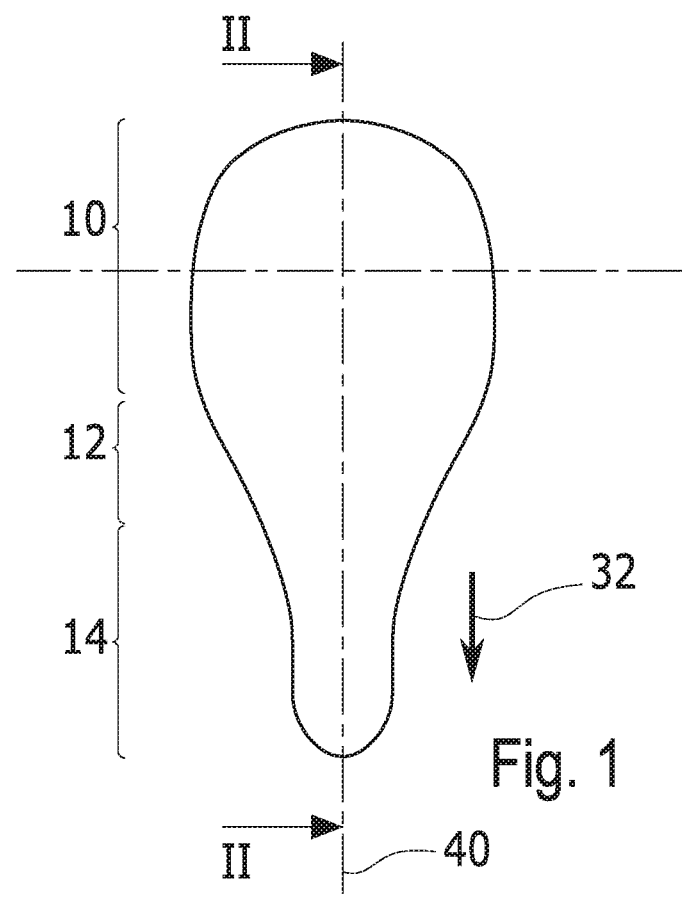
FIG. 1 is a schematic top plan view of a bicycle saddle.

A bicycle saddle comprises a sitting region 10 adjoined by a central region 12 and a region of the saddle tip 14 (FIG. 1). In a rather upright sitting position, the sitbones are essentially positioned in the sitting region 10. The more perched the sitting position is, the farther the pressure points are shifted into the central region 12 or even also into the region of the saddle tip 14.

Figure 2:
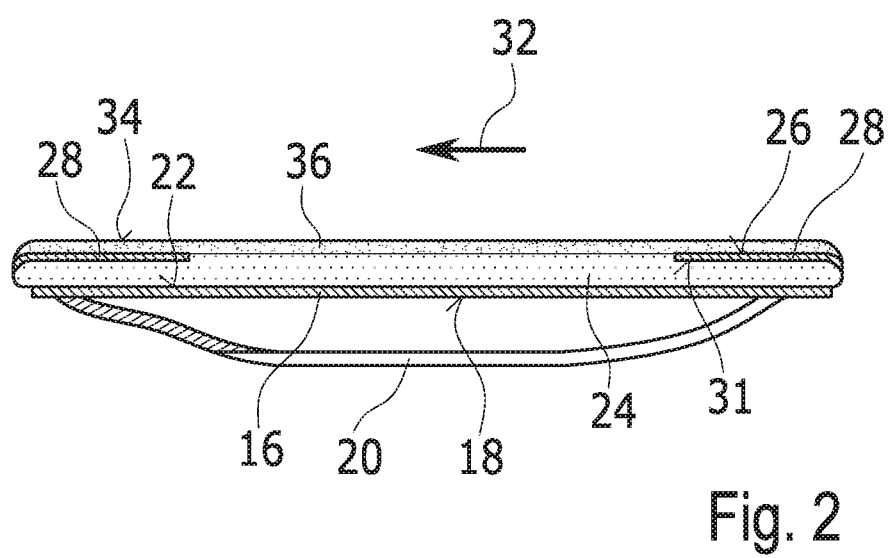
FIG. 2 is a schematic sectional view of the bicycle saddle in the longitudinal direction along line II-II in FIG. 1.

The bicycle saddle has a saddle shell 16 with a saddle frame 20 arranged on the lower side 18 thereof (FIG. 2). The saddle frame 20 serves for connection with a seat post. A first cushion element 24 is provided on an upper side 22 of the saddle shell 18. The upper side 26 of the first cushion element 24 has an intermediate shell 28 arranged thereon so that a lower side 31 of the intermediate shell 28 rests on the upper side 26 of the first cushion element 24. In the embodiment illustrated, the saddle shell 28 comprises a recess 30 extending in the longitudinal direction or in the traveling direction 32, respectively.

On the upper side 34 of the intermediate shell 28 a second cushion element 36 is arranged, wherein the second cushion element 36 protrudes into the recess 30, so that the two cushion elements 24, 36 contact each other or abut against each other. If so desired, the two cushion elements 24, 36 may also be formed integrally and in particular be manufactured together.

Figure 3:
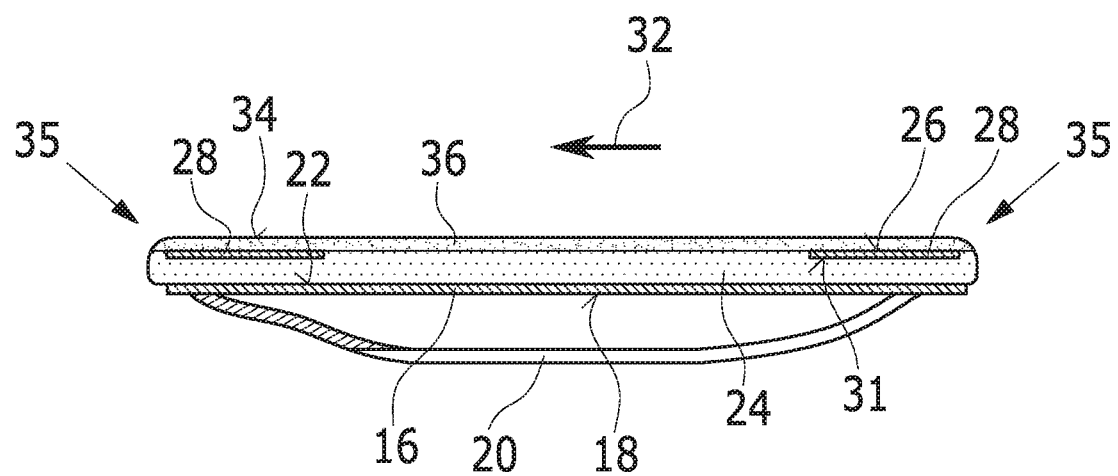
FIG. 3 is a schematic sectional view of an alternative bicycle saddle in the longitudinal direction corresponding to the bicycle saddle illustrated in FIG. 2.

In the alternative embodiment of the bicycle saddle illustrated in FIG. 3 similar and identical components are identified by the same reference numerals.

The only essential difference is that the intermediate shell 28 does not protrude into the edge region of the saddle. As such, the intermediate shell 28 does not protrude into the edge region 35. Rather, the two cushion elements 24, 36 lie directly one upon the other in this edge region, so that a softer edge is formed. Such a design is advantageous not only in the region of the saddle tip 14, as well as in the rear region of the saddle, as illustrated in FIG. 3, but also in particular in the lateral region, since the inner side of the upper thigh of the user is in contact with the saddle.

Figure 4:
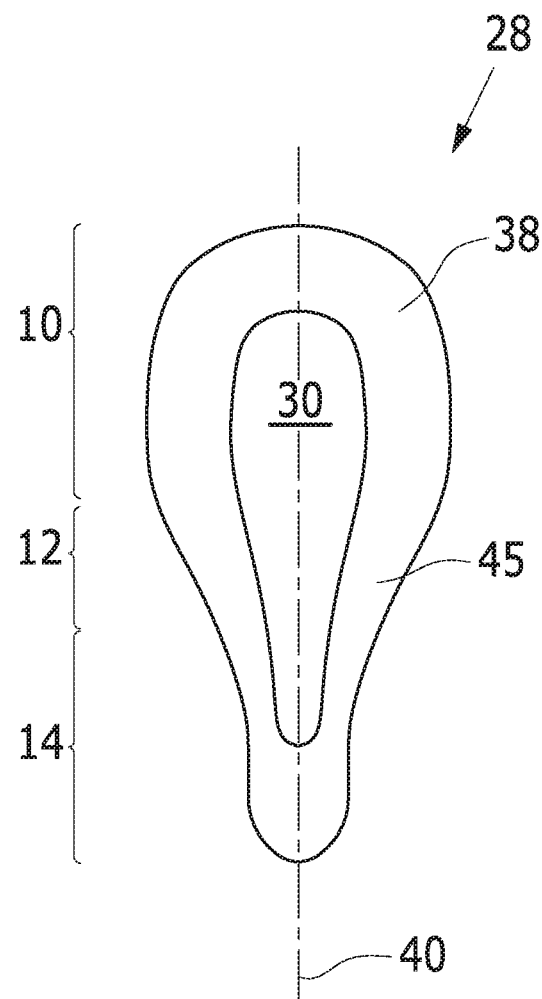
FIG. 4 is a schematic top plan view of an intermediate shell.

As can be seen in FIG. 4, the recess 30 has different regions. It is preferred that the recess 30 is wider in the sitting region 10 than in the central region 12 and in the region of the saddle tip 14. As illustrated in the embodiment, it is further preferred that an edge region 38 in the sitting region 10 is wider than an edge region 45 in the central region 12. By designing the width of the edge region correspondingly, the comfort and the elasticity can be adjusted. The latter may in addition be adjusted by the type of material used and/or the material thickness.

The intermediate shell 28, as well as preferably the entire saddle, are symmetric with respect to a center line 40 that extends in the traveling direction 32.

The invention claimed is:

1. A bicycle saddle comprising
a saddle shell,
a saddle frame arranged on a lower side of the saddle shell,
a first cushion element arranged on an upper side of the saddle shell,
an intermediate shell of a hard plastic material arranged on an upper side of the first cushion element, and
a second cushion element arranged on an upper side of the intermediate shell,
wherein the intermediate shell comprises at least one recess, and
wherein the first cushion element and the second cushion element contact each other in a region of the at least one recess, and
wherein the first and second cushion elements, or at least a portion of the first and second cushion elements, are formed integrally, so that a single complete cushion is defined by the connection between the first and second cushion elements within the at least one recess.

2. The bicycle saddle of claim 1, wherein the intermediate shell is formed in a frame-shaped design and is arranged only around an edge region of the cushion elements.

3. The bicycle saddle of claim 1, wherein the recess is formed through a sitting region, a central region, and in a region of a saddle tip.

4. The bicycle saddle of claim 1, wherein the recess is formed to include a portion of a sitting region and a portion of a central region.

5. The bicycle saddle of claim 1, wherein the recess has a width of 40 to 60% of the width of the intermediate shell in a sitting region or in a central region or in a region of a saddle tip.

6. The bicycle saddle of claim 1, wherein the intermediate shell is symmetric with respect to a longitudinal axis.

7. The bicycle saddle of claim 1, wherein the recess is completely spanned by the first cushion element or the second cushion element.

8. The bicycle saddle of claim 1, wherein the at least one recess is positioned to form a contact between the first cushion element and the second cushion element based on a saddle type or application of the saddle, and wherein the at least one recess is arranged such that sitbones of the user are positioned above an intermediate shell.

9. The bicycle saddle of claim 8, wherein the at least one recess is formed in the intermediate shell to increase softness in a central region of the saddle, and wherein the position of the at least one recess avoids contact of the sitbones with an edge of the intermediate shell.

10. The bicycle saddle of claim 1, wherein an intermediate shell provides a first recess positioned to provide comfort by padding sitbones of a rider when a rider is in a bent sitting position and a second recess is positioned to provide comfort by padding sitbones of a rider when a rider is in an upright sitting position.

* * * * *